United States Patent
Nogami

(10) Patent No.: US 8,675,495 B2
(45) Date of Patent: Mar. 18, 2014

(54) COMMUNICATION SYSTEM

(75) Inventor: Kousuke Nogami, Tokyo (JP)

(73) Assignee: NEC Corporation, Tokyo (JP)

( * ) Notice: Subject to any disclaimer, the term of this patent is extended or adjusted under 35 U.S.C. 154(b) by 275 days.

(21) Appl. No.: 13/259,043

(22) PCT Filed: Feb. 10, 2010

(86) PCT No.: PCT/JP2010/000805
§ 371 (c)(1),
(2), (4) Date: Sep. 22, 2011

(87) PCT Pub. No.: WO2010/109752
PCT Pub. Date: Sep. 30, 2010

(65) Prior Publication Data
US 2012/0014259 A1    Jan. 19, 2012

(30) Foreign Application Priority Data

Mar. 25, 2009  (JP) .................................. 2009-073756

(51) Int. Cl.
*H04L 12/26* (2006.01)

(52) U.S. Cl.
USPC ......................................................... 370/241

(58) Field of Classification Search
USPC ................. 370/229, 230, 235, 238, 241, 242, 370/395.21, 508, 519
See application file for complete search history.

(56) References Cited

U.S. PATENT DOCUMENTS 8,503,299 B2 *  8/2013  Senarath et al. .............. 370/235

FOREIGN PATENT DOCUMENTS

| JP | 10-336244 A | 12/1998 |
|----|-------------|---------|
| JP | 2003-304180 A | 10/2003 |
| JP | 2007-60345 A | 3/2007 |
| JP | 2009-504084 A | 1/2009 |

OTHER PUBLICATIONS

Mark Kalman, et al., "Modeling the Delays of Successively-Transmitted Internet Packets", IEEE International Conference on Multimedia and Expo (ICME), Jun. 2004, pp. 2015-2018, vol. 3.
Z. Liu, et al., "Traffic Modeling with Gamma Mixtures and Dynamical Bandwidth Provisioning", Proceedings of the 4th Annual Communication Networks and Services Research Conference (CNSR'06), 2006, pp. 1-8.
T. Friedman, et al., "RTP Control Protocol Extended Reports (RTCP XR)", RFC3611, IETF (Internet Engineering Task Force), Nov. 2003, pp. 1-55.

(Continued)

*Primary Examiner* — Kwang B Yao
*Assistant Examiner* — Syed M Bokhari
(74) *Attorney, Agent, or Firm* — Sughrue Mion, PLLC

(57) ABSTRACT

A communication system includes a transmission device configured to transmit a packet and a reception device configured to receive the packet. The reception device is equipped with a behavior information acquisition unit, a model specification information acquisition unit, and a model specification information transmission unit. The behavior information acquisition unit acquires behavior information representing the behavior of a packet before the packet reaches the reception device from the transmission device. The model specification information acquisition unit acquires model specification information for specifying a mathematical model representing the behaviors of a plurality of packets based on the acquired behavior information. The model specification information transmission unit transmits the acquired model specification information to the transmission device. The transmission device is equipped with a model specification information reception unit. The model specification information reception unit receives model specification information.

25 Claims, 6 Drawing Sheets

(56) References Cited

OTHER PUBLICATIONS

M. Handley, et al., "TCP Friendly Rate Control (TFRC): Protocol Specification", RFC3448, IETF (Internet Engineering Task Force), Jan. 2003, pp. 1-24.

Christoffer A. Rodbro, et al., "Hidden Markov Model-Based Packet Loss Concealment for Voice Over IP", IEEE Transactions on Audio, Speech & Language Processing, 2006, pp. 1609-1623, vol. 14, No. 5.

Fernando Silveira, et al., "Predicting packet loss statistics with hidden Markov models", ACM SIGMETRICS Performance Evaluation Review, 2007, pp. 19-21, vol. 35.

Japanese Office Action issued Jan. 14, 2014 in corresponding Japanese Patent Application No. 2011-505823.

* cited by examiner

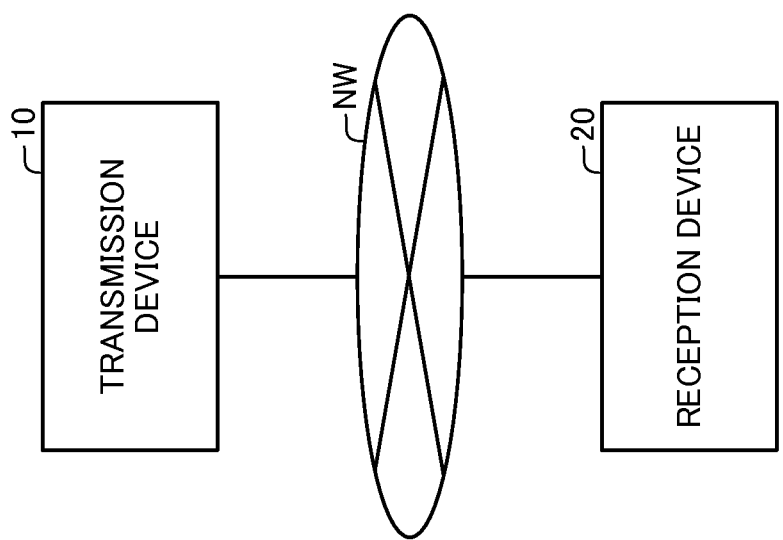

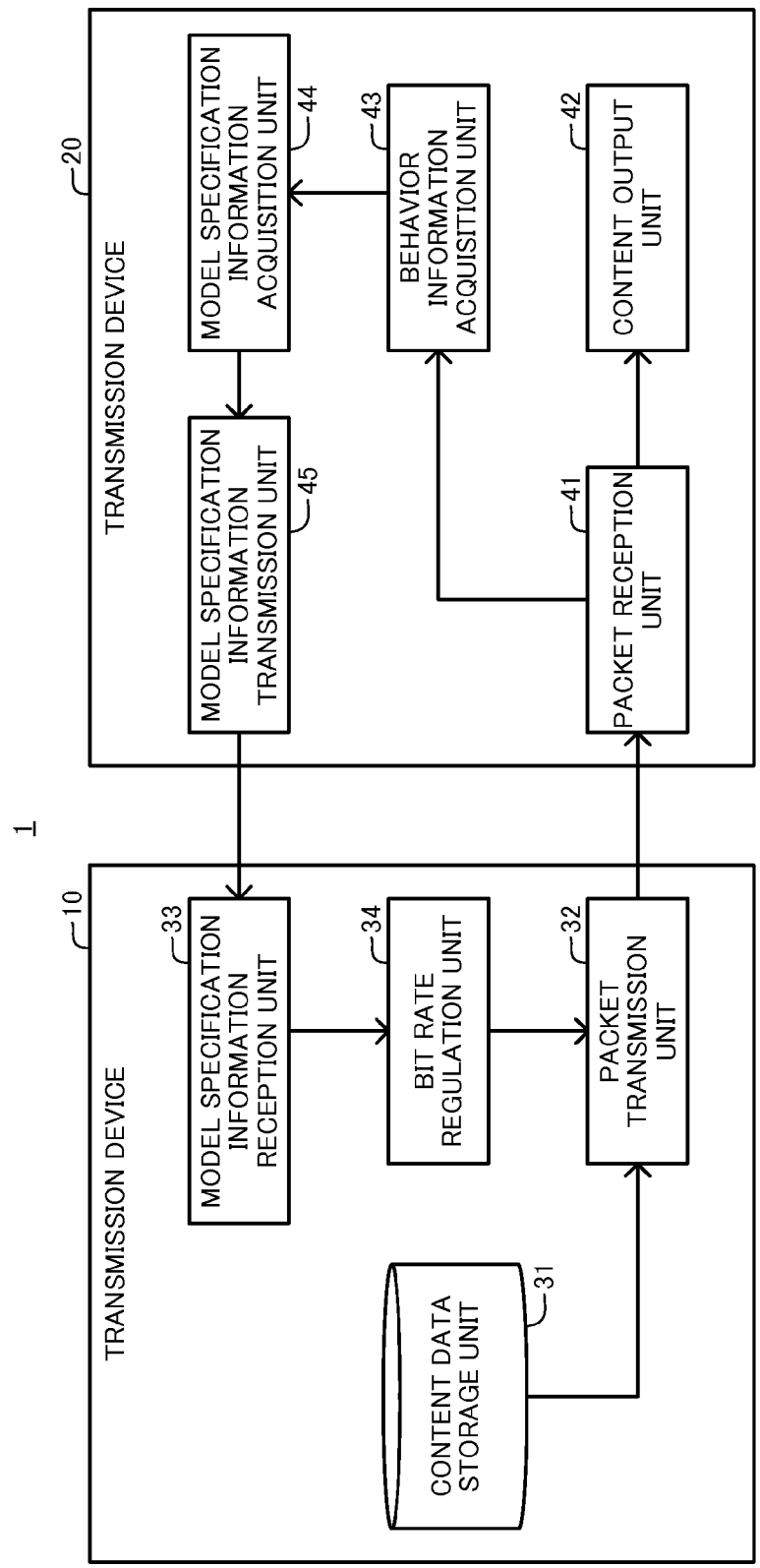

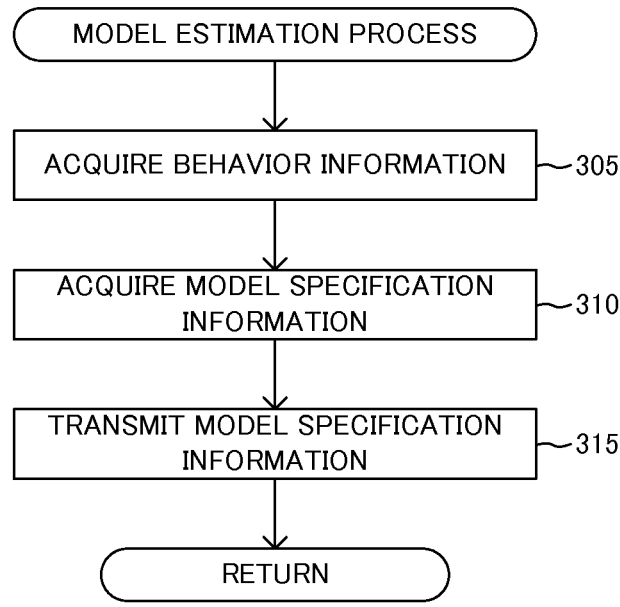
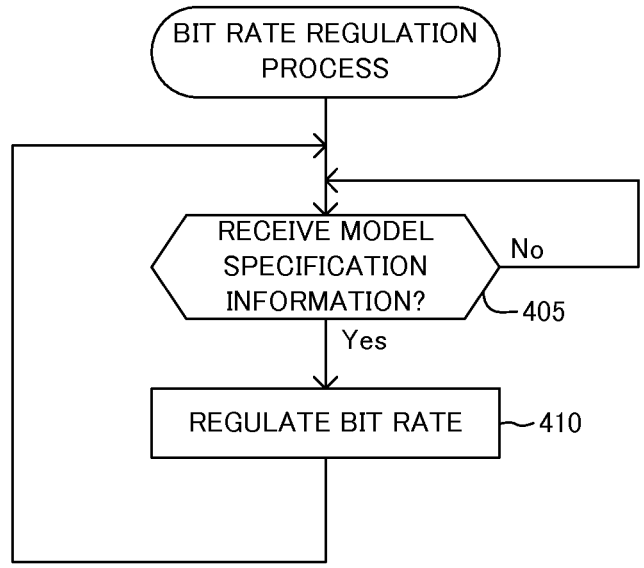

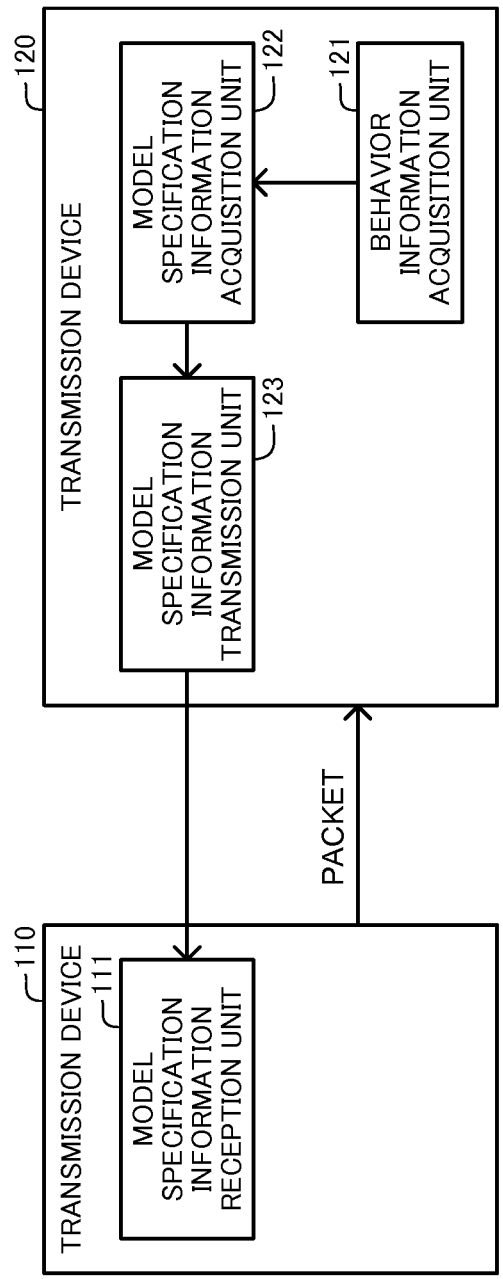

COMMUNICATION SYSTEM

CROSS REFERENCE TO RELATED APPLICATIONS

This application is a National Stage of International Application No. PCT/JP2010/000805, filed on Feb. 10, 2010, which claims priority from Japanese Patent Application No. 2009-073756, filed on Mar. 25, 2009, the contents of all of which are incorporated herein by reference in their entirety.

TECHNICAL FIELD

The present invention relates to a communication system that includes a transmission device transmitting a packet and a reception device receiving the packet.

BACKGROUND ART

A communication system that includes a transmission device transmitting a packet and a reception device receiving the packet is known. In a communication system of this kind, when the amount of packets transmitted by the transmission device to the reception device per unit time (a communication load) becomes excessive, a delay time becomes excessive, or the packets do not reach the reception device (i.e., the packets are lost). A delay time is a time for a packet to reach the reception device from the transmission device.

The communication system described in Non-Patent Documents 1 and 2 estimate a mathematical model representing the behavior of a packet before reaching the reception device from the transmission device, and regulate the amount of packets transmitted by the transmission device (e.g., the bit rate of data that becomes the basis of a packet) based on the estimated mathematical model. Therefore, in the communication systems described above, the transmission device needs to acquire behavior information that represents the behavior of a packet and estimate a mathematical model based on the acquired behavior information.

In a communication system described in Non-Patent Document 3, every time receiving a packet, the reception device acquires a time when the packet is received (a reception time), and transmits the acquired reception time to the transmission device.

[Non-Patent Document 1] M. Kalman, B. Girod, "MODELING THE DELAYS OF SUCCESSIVELY-TRANSMITTED INTERNET PACKETS," 2004 IEEE International Conference on Multimedia and Expo (ICME), IEEE-Press, June 2004, Vol. 3, pp. 2015-2018

[Non-Patent Document 2] Z. Liu and three others, "Traffic modeling with gamma mixtures and dynamical bandwidth provisioning," Proceedings of the 4th Annual Communication Networks and Services Research Conference, IEEE-Press, 2006, pp. 123-130

[Non-Patent Document 3] T. Friedman and two others, "RTP Control Protocol Extended Reports (RTCP XR)," RFC3611, IETF (Internet Engineering Task Force) November 2003

Therefore, the transmission device can acquire behavior information that represents a delay time based on the reception time and based on a time when the transmission device transmits a packet (a transmission time). Consequently, the transmission device can estimate the abovementioned mathematical model based on the acquired behavior information. However, the communication system has a problem that a communication load becomes excessive because the reception device transmits behavior information for each packet to the transmission device. That is to say, there is a problem that a communication load when the transmission device acquires information representing the behavior of a plurality of packets becomes excessive.

SUMMARY

Accordingly, an object of the present invention is to provide a communication system capable of solving the abovementioned problem "a communication load when the transmission device acquires information representing the behavior of a plurality of packets becomes excessive."

In order to achieve the object, a communication system of an embodiment of the present invention is a system including a transmission device configured to transmit a packet and a reception device configured to receive the packet.

Moreover, the reception device includes:

a behavior information acquisition means configured to acquire behavior information that represents behavior of the received packet from when the packet is transmitted by the transmission device to when the packet reaches the reception device;

a model specification information acquisition means configured to acquire model specification information for specifying a mathematical model representing the behavior of a plurality of packets based on the behavior information acquired for each of the plurality of packets; and a model specification information transmission means configured to transmit the acquired model specification information to the transmission device.

In addition, the transmission device includes a model specification information reception means configured to receive the model specification information transmitted by the reception device.

Further, a communication method of another embodiment of the present invention is a method applied to a communication system including a transmission device configured to transmit a packet and a reception device configured to receive the packet.

Moreover, the communication method includes:

acquiring behavior information that represents behavior of the packet received by the reception device from when the packet is transmitted by the transmission device to when the packet reaches the reception device, by the reception device;

acquiring model specification information for specifying a mathematical model representing the behavior of a plurality of packets based on the behavior information acquired for each of the plurality of packets, by the reception device;

transmitting the acquired model specification information to the transmission device, by the reception device; and receiving the model specification information transmitted by the reception device, by the transmission device.

Further, a reception device of another embodiment of the present invention is a device configured to receive a packet transmitted by a transmission device.

Moreover, the reception device includes:

a behavior information acquisition means configured to acquire behavior information that represents behavior of the received packet from when the packet is transmitted by the transmission device to when the packet reaches the reception device;

a model specification information acquisition means configured to acquire model specification information for specifying a mathematical model representing the behavior of a plurality of packets based on the behavior information acquired for each of the plurality of packets; and a model specification information transmission means configured to transmit the acquired model specification information to the transmission device.

Further, a program of another embodiment of the present invention is a program including instructions for causing a reception device configured to receive a packet transmitted by a transmission devise to realize:

a behavior information acquisition means configured to acquire behavior information that represents behavior of the received packet from when the packet is transmitted by the transmission device to when the packet reaches the reception device;

a model specification information acquisition means configured to acquire model specification information for specifying a mathematical model representing the behavior of a plurality of packets based on the behavior information acquired for each of the plurality of packets; and a model specification information transmission means configured to transmit the acquired model specification information to the transmission device.

Further, a transmission device of another embodiment of the present invention is a device configured to transmit a packet to a reception device.

Moreover, the transmission device includes a model specification information reception means configured to receive model specification information, which is information transmitted by the reception device and is information for specifying a mathematical model representing behavior of a plurality of packets from when the plurality of packets are transmitted by the transmission device to when the plurality of packets reach the reception device.

Further, a program of another embodiment of the present invention is a program comprising instructions for causing a transmission device configured to transmit a packet to a reception device to realize a model specification information reception means configured to receive model specification information, which is information transmitted by the reception device and is information for specifying a mathematical model representing behavior of a plurality of packets from when the plurality of packets are transmitted by the transmission device to when the plurality of packets reach the reception device.

With the configurations of the present invention as described above, it is possible to reduce a communication load when the transmission device acquires information representing the behavior of a plurality of packets.

BRIEF DESCRIPTION OF DRAWINGS

FIG. 1 is a diagram showing a schematic configuration of a content delivery system according to a first exemplary embodiment of the present invention;

FIG. 2 is a block diagram showing a schematic configuration of the content delivery system according to the first exemplary embodiment of the present invention;

FIG. 3 is a flowchart showing a model estimation process program executed by a CPU of a reception device according to the first exemplary embodiment of the present invention;

FIG. 4 is a flowchart showing a bit rate regulation process program executed by a CPU of a transmission device according to the first exemplary embodiment of the present invention;

FIG. 8 is a block diagram showing a schematic function of a content delivery system according to a third exemplary embodiment of the present invention.

EXEMPLARY EMBODIMENTS

Figure 5:
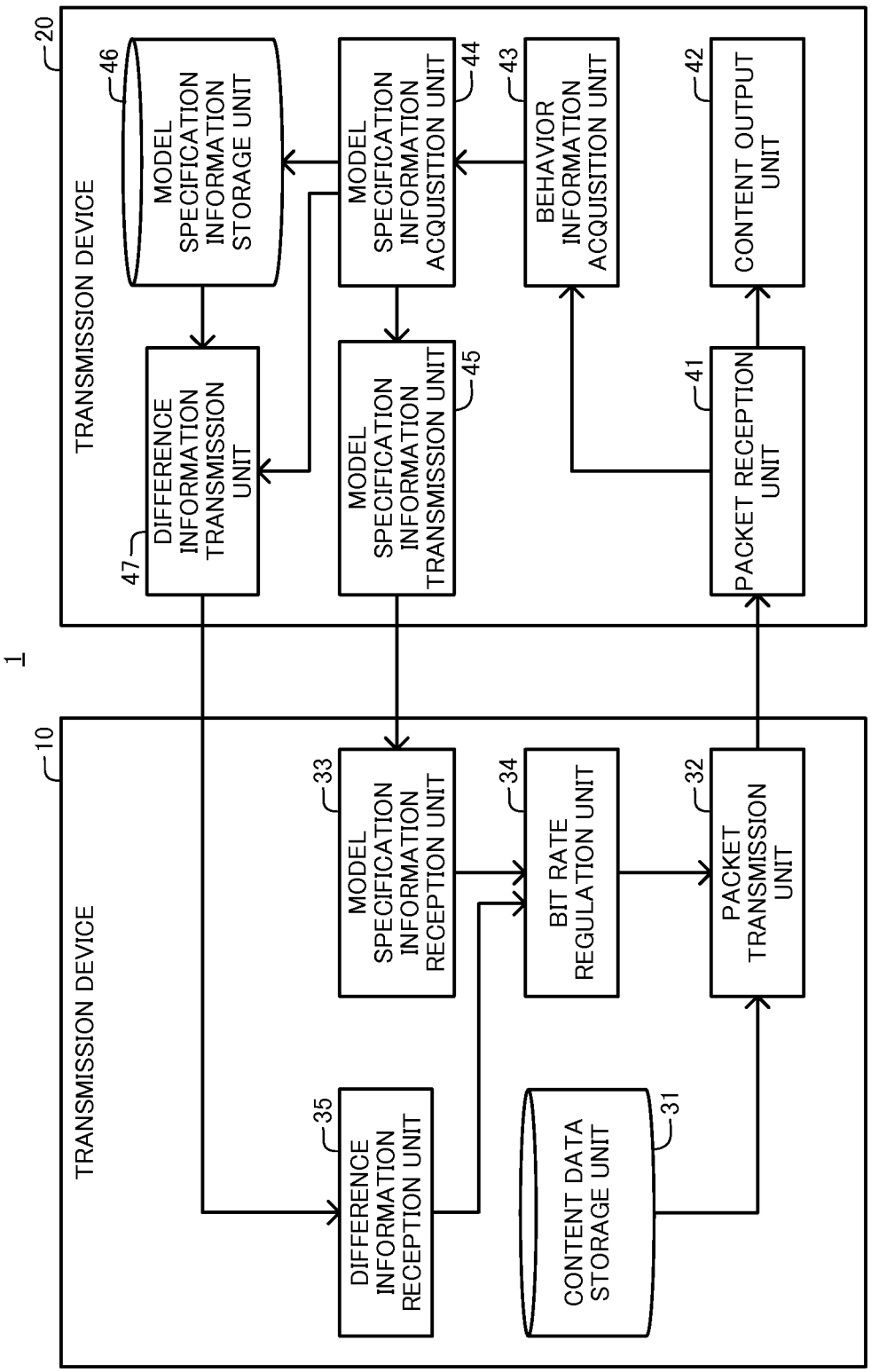
FIG. 5 is a block diagram showing a schematic function of a content delivery system according to a second exemplary embodiment of the present invention.

A communication system of an embodiment of the present invention is a system including a transmission device configured to transmit a packet and a reception device configured to receive the packet.

Further, the reception device includes:

a behavior information acquisition means configured to acquire behavior information that represents behavior of the received packet from when the packet is transmitted by the transmission device to when the packet reaches the reception device;

a model specification information acquisition means configured to acquire model specification information for specifying a mathematical model representing the behavior of a plurality of packets based on the behavior information acquired for each of the plurality of packets; and a model specification information transmission means configured to transmit the acquired model specification information to the transmission device.

In addition, the transmission device includes a model specification information reception means configured to receive the model specification information transmitted by the reception device.

According to this, the information amount of information transmitted by the reception device to the transmission device in order that the transmission device acquires information representing the behavior of a plurality of packets can be smaller than when the reception device transmits the behavior information of the respective packets. That is to say, it is possible to reduce a communication load when the transmission device acquires information representing the behavior of a plurality of packets. Moreover, according to the abovementioned configuration, it is possible to reduce a communication load of the transmission device as compared with when the transmission device acquires model specification information based on behavior information.

In this case it is preferable that the model specification information has a smaller information amount than an information amount of the plurality of behavior information.

In this case it is preferable that the transmission device includes a bit rate regulation means configured to regulate a bit rate of data that is a source of a packet transmitted to the reception device, based on the mathematical model specified by the received model specification information.

According to this, the transmission device can transmit data at a bit rate corresponding to the behavior of a packet represented by a mathematical model. As a result, for example, in a case that a time for a packet to reach the reception device after being transmitted by the transmission device (a delay time) is relatively large, it is possible to reliably transmit the packet from the transmission device to the reception device by decreasing the bit rate. Moreover, for example, in a case that the delay time is relatively small, it is possible to deliver data of relatively high quality (image quality, sound quality, and the like) by increasing the bit rate.

Further, in another aspect of the communication system, the transmission device includes a packet redundancy number regulation means configured to, in a case of being configured to transmit a plurality of same packets, regulate a redundancy number, which is a number of the same packets transmitted by the transmission device, based on the mathematical model specified by the received model specification information.

The transmission device may be configured to transmit a plurality of same packets in case a packet transmitted by the transmission device does not reach the reception device. In this case, according to the abovementioned configuration, the transmission device can transmit same packets of a redundancy number corresponding to the behavior of a packet represented by a mathematical model.

As a result, for example, in a case that a time for a packet to reach the reception device after being transmitted by the transmission device (a delay time) is relatively large, it is possible to reliably transmit the packet from the transmission device to the reception device by increasing the redundancy number. Moreover, for example, in a case that the delay time is relatively small, it is possible to reduce a communication load by decreasing the redundancy number.

In this case, it is preferable that:

the reception device includes:
a model specification information storage means configured to store the acquired model specification information; and
a difference information transmission means configured to transmit difference information that represents a difference between the model specification information acquired and stored in the past and model specification information acquired at the present moment, to the transmission device; and
the transmission device includes a difference information reception means configured to receive the difference information transmitted by the reception device.

According to this, the transmission device can estimate a future mathematical model based on received difference information. Consequently, the transmission device can more promptly execute a process (e.g., a process of regulating the bit rate) corresponding to the behavior of a packet represented by the mathematical model.

In this case, it is preferred that the mathematical model is a model represented by a function using at least one model parameter and the model specification information is information that represents the model parameter.

In this case, it is preferred that the mathematical model is a model represented by a probability density function using the behavior information as a random variable.

In this case, it is preferred that the probability density function is a probability density function representing a normal distribution and the model specification information is information that represents a mean and a variance of the normal distribution.

Further, in another aspect of the communication system, it is preferred that the probability density function is a probability density function representing a gamma distribution and the model specification information is information that represents a shape parameter and a scale parameter of the gamma distribution.

Further, in another aspect of the communication system, it is preferred that the mathematical model is a hidden Markov model using the behavior information as a symbol.

In this case, it is preferred that the behavior information includes information representing a delay time, which is a time for the packet to reach the reception device after being transmitted by the transmission device.

Further, in another aspect of the communication system, it is preferred that the behavior information includes information that represents a difference between a first delay time for one of two packets successively received by the reception device to reach the reception device after being transmitted by the transmission device and a second delay time for the other of the two packets to reach the reception device after being transmitted by the transmission device.

Further, a communication method of another embodiment of the present invention is a method applied to a communication system including a transmission device configured to transmit a packet and a reception device configured to receive the packet.

Furthermore, the communication method is a method including:

acquiring behavior information that represents behavior of the packet received by the reception device from when the packet is transmitted by the transmission device to when the packet reaches the reception device, by the reception device;
acquiring model specification information for specifying a mathematical model representing the behavior of a plurality of packets based on the behavior information acquired for each of the plurality of packets, by the reception device;
transmitting the acquired model specification information to the transmission device, by the reception device; and
receiving the model specification information transmitted by the reception device, by the transmission device.

In this case, it is preferred that the model specification information has a smaller information amount than an information amount of the plurality of behavior information.

Further, a reception device of another embodiment of the present invention is a device configured to receive a packet transmitted by a transmission device.

Further, the reception device includes:
a behavior information acquisition means configured to acquire behavior information that represents behavior of the received packet from when the packet is transmitted by the transmission device to when the packet reaches the reception device;
a model specification information acquisition means configured to acquire model specification information for specifying a mathematical model representing the behavior of a plurality of packets based on the behavior information acquired for each of the plurality of packets; and
a model specification information transmission means configured to transmit the acquired model specification information to the transmission device.

In this case, it is preferred that the model specification information has a smaller information amount than an information amount of the plurality of behavior information.

Further, a program of another embodiment of the present invention is a program comprising instructions for causing a reception device configured to receive a packet transmitted by a transmission means to realize:

a behavior information acquisition means configured to acquire behavior information that represents behavior of the received packet from when the packet is transmitted by the transmission device to when the packet reaches the reception device;
a model specification information acquisition means configured to acquire model specification information for specifying a mathematical model representing the behavior of a plurality of packets based on the behavior information acquired for each of the plurality of packets; and a model specification information transmission means configured to transmit the acquired model specification information to the transmission device.

In this case, it is preferred that the model specification information has a smaller information amount than an information amount of the plurality of behavior information.

Further, a transmission device of another embodiment of the present invention is a device configured to transmit a packet to a reception device.

Moreover, the transmission device includes a model specification information reception means configured to receive model specification information, which is information transmitted by the reception device and is information for specifying a mathematical model representing behavior of a plurality of packets from when the plurality of packets are transmitted by the transmission device to when the plurality of packets reach the reception device.

In this case, it is preferred that the model specification information has a smaller information amount than an information amount of the plurality of behavior information.

Further, a program of another embodiment of the present invention is a program including instructions for causing a transmission device configured to transmit a packet to a reception device to realize a model specification information reception means configured to receive model specification information, which is information transmitted by the reception device and is information for specifying a mathematical model representing behavior of a plurality of packets from when the plurality of packets are transmitted by the transmission device to when the plurality of packets reach the reception device.

In this case, it is preferred that the model specification information has a smaller information amount than an information amount of the plurality of behavior information.

Inventions of a communication method, a reception device, a program and a transmission device having the configurations described above have actions like those of the abovementioned communication system, and therefore, it is possible of achieve the object of the present invention described above.

Below, the respective exemplary embodiments of a communication system, a communication method, a reception device, a program and a transmission device according to the present invention will be described with reference to FIGS. 1 to 8.

<First Exemplary Embodiment>

As shown in FIG. 1, a content delivery system (a communication system) 1 according to a first exemplary embodiment includes a transmission device 10 and a reception device 20. The transmission device 10 and the reception device 20 are connected so as to be capable of communicating with each other via a communication line (in this embodiment, the Internet) NW.

The transmission device 10 is an information processing device serving as a server device. The transmission device 10 is equipped with a central processing unit (CPU) and a storage device (a memory and a hard disk drive (HDD)), which are not shown in the drawings. The transmission device 10 is configured to realize a function described later by execution of a program stored in the storage device by the CPU.

The reception device 20 is an information processing device serving as a client device. In this embodiment, the reception device 20 is a personal computer. The reception device 20 may be a mobile phone unit, a car navigation device, a game machine, or the like.

The reception device 20 is equipped with a central processing device, a storage device, an input device (in this embodiment, a keyboard, a mouse, etc.) and an output device (in this embodiment, a speaker, a display, etc.), which are not shown in the drawings. The reception device 20 is configured to realize a function described later by execution of a program stored in the storage device by the CPU.

FIG. 2 is a block diagram showing a function of a content delivery system 1 configured as described above. This function is realized by execution of, for example, a program represented by a flowchart shown in FIG. 3 described later by the CPU of the reception device 20 and execution of, for example, a program represented by a flowchart shown in FIG. 4 described later by the CPU of the transmission device 10.

A function of the transmission device 10 includes a content data storage unit 31, a packet transmission unit 32, a model specification information reception unit (a model specification information reception means) 33, and a bit rate regulation unit (a bit rate regulation means) 34. Moreover, a function of the reception device 20 includes a packet reception unit 41, a content output unit 42, a behavior information acquisition unit (a behavior information acquisition means) 43, a model specification information acquisition unit (a model specification information acquisition means), and a model specification information transmission unit (a model specification information transmission means) 45.

The content data storage unit 31 previously stores content data representing content (e.g., images and sound). The content data storage unit 31 stores a plurality of content data obtained by encoding one piece of content with each of a plurality of different bit rates.

The packet transmission unit 32 acquires content data encoded at a bit rate determined by the bit rate regulation unit 34 from the content data stored in the content data storage unit 31. The packet transmission unit 32 divides the acquired content data by a preset data size. For each of the plurality of data obtained by division, the packet transmission unit 32 generates a packet including the data and a sequence number. A sequence number is information representing the position of data included by a packet in content data from which the data is obtained. A sequence number is a value that is smaller as data is positioned closer to the head. The packet transmission unit 32 transmits the generated packets one by one to the reception device 20 in order of the sequence number increasing from a packet having the smallest sequence number.

The packet reception unit 41 receives the packets transmitted by the transmission device 10.

The content output unit 42 causes the storage device to store the data (part of the content data) included by the packets received by the packet reception unit 41. The content output unit 42 reproduces the content represented by part of the content data stored in the storage device (i.e., streaming).

The behavior information acquisition unit 43 acquires behavior information that represents the behavior (the action) of a packet received by the packet reception unit 41 from when the packet is transmitted by the transmission device 10 to when the packet reaches the reception device 20. In this embodiment, behavior information is information representing a delay time that is a time for a packet to reach the reception device 20 after being transmitted by the transmission device 10. The behavior information acquisition unit 43 acquires (estimates) a delay time based on a time (a reception time) when a packet is received by the packet reception unit 41 and a sequence number included by the packet.

The model specification information acquisition unit 44 acquires model specification information for specifying a mathematical model representing the behavior of a plurality of packets based on behavior information acquired by the behavior information acquisition unit 43 for each of the plurality of packets. In this embodiment, a mathematical model is a model represented by a probability density function f(x) formed by the linear sum of a plurality of (in this embodiment, M pieces of) probability density functions using behavior information (in this embodiment, a delay time) as a random variable x, as shown by an expression (1) as follows:

[Expression 1]

$$f(x) = \sum_{i=1}^{M} \pi_i g_i(x \mid \Theta_i) \quad (1)$$

In the expression, $\pi_i$ is a coefficient representing weighting (a mixture ratio of probability density functions), $g_i$ is a probability density function, and $\Theta_i$ is function specification information for specifying the probability density function $g_i$.

The probability density function $g_i$ is a probability density function representing a normal distribution, a probability density function representing a gamma distribution, and the like. The function specification information $\Theta_i$ for specifying the probability density function $g_i$ representing a normal distribution is information representing the mean and variance of the normal distribution. The function specification information $\Theta_i$ for specifying the probability density function $g_i$ representing the gamma distribution is information representing the shape parameter and scale parameter of a gamma distribution. In this embodiment, model specification information is the coefficient $g_i$ and the function specification information $\Theta_i$. In this description, a coefficient $g_i$ and the function specification information $\Theta_i$ are also referred to as model parameters.

Therefore, in a case that the number of packets from which behavior information is acquired is large relatively to the number of the probability density functions $g_i$ (i.e., M), the information amount of model specification information is smaller than the information amount of behavior information acquired for each of the plurality of packets.

The model specification information transmission unit 45 transmits model specification information acquired by the model specification information acquisition unit 44 to the transmission unit 10.

The model specification information reception unit 33 receives the model specification information transmitted by the reception device 20.

The bit rate regulation unit 34 regulates (determines) a bit rate based on a mathematical model specified by the model specification information received by the model specification information reception unit 33. Because a specific method for determining a bit rate based on a mathematical model by the bit rate regulation unit 34 is described in known documents such as Non-Patent Document 2 described above and Non-Patent Document 4 described below, a detailed description will be omitted in this description.

[Non-Patent Document 4] M. Handley and three others, "TCP Friendly Rate Control (TFRC): Protocol Specification," RFC3448, IETF (Internet Engineering Task Force), January, 2003

For example, in Non-Patent Document 2, a method of determining a bit rate based on a parameter of mixture distribution by gamma distribution is described. Moreover, in Non-Patent Document 4, a method of determining a bit rate based on a delay time or a packet loss ratio is described. A packet loss ratio is the ratio of the number of packets having not reached a reception device to the number of all packets having been transmitted from a transmission device.

Next, an operation of the content delivery system 1 described above will be specifically described.

The CPU of the reception device 20 is configured to execute a model estimation process program shown by a flowchart in FIG. 3 every time a preset execution period elapses. The reception device 20 may be configured to detect a communication load and execute the model estimation process program at the timing corresponding to the detected communication load.

To be specific, upon start of the processing of the model estimation process program, the CPU of the reception device 20 acquires behavior information for each of packets received by the reception device 20 up to a present moment after previous execution of this program at step 305 (a behavior information acquisition step).

Then, the CPU acquires model specification information based on the acquired behavior information (step 310, a model specification information acquisition step). In this embodiment, the CPU acquires model specification information by estimating model specification information by using maximum likelihood estimation.

Next, the CPU transmits the acquired model specification information to the transmission device 10 (step 315, a model specification information transmission step). Then, the CPU ends execution of this model estimation process program.

On the other hand, the CPU of the transmission device 10 is configured to execute a bit rate regulation process program shown by a flowchart in FIG. 4 when the transmission device 10 is started.

To be specific, upon start of the processing of the bit rate regulation process program, the CPU of the transmission device 10 stands by until receiving model specification information at step 405. Then, when the transmission device 10 receives the model specification information transmitted by the reception device 20 (a model specification information reception step), the CPU of the transmission device 10 determines "Yes" and proceeds to step 410.

The CPU regulates (determine) a bit rate based on a mathematical model specified by the received model specification information at step 410. After that, the transmission device 10 transmits content data encoded at the determined bit rate among the content data stored in the storage device, to the reception device 20.

Then, the CPU returns to step 405 and repeatedly executes the process from step 405 to step 410.

As described above, according to the first exemplary embodiment of the content delivery system (the communication system) of the present invention, the information amount of information transmitted to the transmission device 10 by the reception device 20 in order that the transmission device 10 acquires information representing the behavior of a plurality of packets can be smaller than that in transmitting behavior information of the respective packets by the reception device 20. In other words, it is possible to reduce a communication load when the transmission device 10 acquires information representing the behavior of a plurality of packets. Moreover, with the abovementioned configuration, it is possible to make a processing load of the transmission device 10 smaller than in acquiring model specification information based on behavior information by the transmission device 10.

Furthermore, in the first exemplary embodiment, the transmission device 10 can transmit data at a bit rate corresponding to the behavior of a packet represented by a mathematical model. As a result, in a case that a time for a packet to reach the reception device 20 after being transmitted by the transmission device 10 (a delay time) is relatively large, it is possible to reliably transmit the packet from the transmission device 10 to the reception device 20 by decreasing a bit rate. Moreover, in a case that the delay time is relatively small, it is possible to deliver data of relatively high quality (image quality, sound quality, and the like) by increasing the bit rate.

In a modified example of the first exemplary embodiment, the transmission device 10 may be configured to transmit a plurality of same packets in case a packet does not reach the reception device 20 from the transmission device 10. In this case, it is preferred that the function of the transmission device 10 includes a packet redundancy number regulation unit (a packet redundancy number regulation means) that regulates the redundancy number based on a mathematical model. The redundancy number is the number of same packets transmitted by the transmission device 10.

Further, in this case, the mathematical model may be a hidden Markov model using behavior information as a symbol. The hidden Markov model is a probability model formed by states transiting in accordance with a Markov process (a future behavior is determined by only a present behavior and is not related with a past behavior) and a probability distribution representing a probability that a value called 'symbol' appears in each state.

In other words, in this modified example, model specification information is information representing a transition probability between the respective states (the number of states is included in a state transition probability), and information for specifying a probability distribution representing a probability that a symbol appears in each state (e.g., information representing the mean and variance of a normal distribution in a case that a probability distribution is a normal distribution).

Because a specific method for determining the redundancy number based on a mathematical model by the transmission device 10 according to this modified example is described in known documents such as Non-Patent Documents 5 and 6 described below, a detailed description thereof in this description will be omitted.

[Non-Patent Document 5] C. A. Rodbro and three others, "Hidden Markov model-based packet loss concealment for voice over IP," IEEE Transactions on Audio, Speech & Language Processing, IEEE, 2006, volume 14, issue 5, pp. 1609-1623

[Non-Patent Document 6] F. Silveira and one other, "Predicting packet loss statistics with hidden Markov models," ACM SIGMETRICS Performance Evaluation Review, 2007, volume 35, pp. 19-21

For example, in Non-Patent Documents 5 and 6 described above, a method of determining the redundancy number so as to minimize an influence of a packet loss by stochastically obtaining an occurrence pattern of a packet loss by using the hidden Markov model is described. A packet loss represents a phenomenon that a packet does not reach the reception device 20.

For example, by the abovementioned method, it is possible to obtain a probability that a packet loss successively occurs (a probability that a plurality of (e.g., two or three) packets do not reach the reception device 20 successively), based on the hidden Markov model.

Therefore, it is preferred to configure the transmission device 10 so that the transmission device 10 can increase the redundancy number when the obtained probability is higher than a predetermined upper limit threshold. As a result, it is possible to reliably transmit a packet from the transmission device 10 to the reception device 20. Moreover, it is preferred to configure the transmission device 10 so that the transmission device 10 can decrease the redundancy number when the obtained probability is lower than a predetermined lower limit threshold. As a result, it is possible to reduce a communication load.

<Second Exemplary Embodiment>

Next, a content delivery system according to a second exemplary embodiment of the present invention will be described. The content delivery system according to the second exemplary embodiment is different from the content delivery system according to the first exemplary embodiment in that the reception device 20 transmits difference information to the transmission device 10. Difference information is information representing a difference between model specification information acquired in the past and model specification information acquired at the present moment.

Therefore, a description will be made focusing on the different point.

As shown in FIG. 5, a function of the transmission device 10 according to the second exemplary embodiment includes a difference information reception unit (a difference information reception means) 35, in addition to the content data storage unit 31, the packet transmission unit 32, the model specification information reception unit 33 and the bit rate regulation unit 34 of the first exemplary embodiment. Moreover, the function of the reception device 20 includes a model specification information storage unit (a model specification information storage means) 46 and a difference information transmission unit (a difference information transmission means) 47, in addition to the packet reception unit 41, the content output unit 42, the behavior information acquisition unit 43, the model specification information acquisition unit 44 and the model specification information transmission unit 45 of the first exemplary embodiment.

The model specification information storage unit 46 stores model specification information acquired by the model specification information acquisition unit 44.

The difference information transmission unit 47 acquires difference information representing a difference between model specification information acquired in the past among model specification information stored in the model specification information storage unit 46 and model specification information acquired by the model specification information acquisition unit 44 at the present moment.

In this exemplary embodiment, difference information is information representing a difference of the coefficients $\pi_i$ and a difference of the function specification information $\Theta_i$. Difference information may be other information as far as it is information representing a change of a mathematical model specified by model specification information.

The difference information transmission unit 47 transmits the acquired difference information to the transmission device 10.

The difference information reception unit 35 receives the difference information transmitted by the reception device 20.

The bit rate regulation unit 34 estimates a future mathematical model based on a mathematical model specified by model specification information received by the model specification information reception unit 33 and the difference information received by the difference information reception unit 35. Then, the bit rate regulation unit 34 regulates (determines) a bit rate based on the estimated future mathematical model.

Next, an operation of the abovementioned content delivery system 1 will be specifically described.

Figure 6:
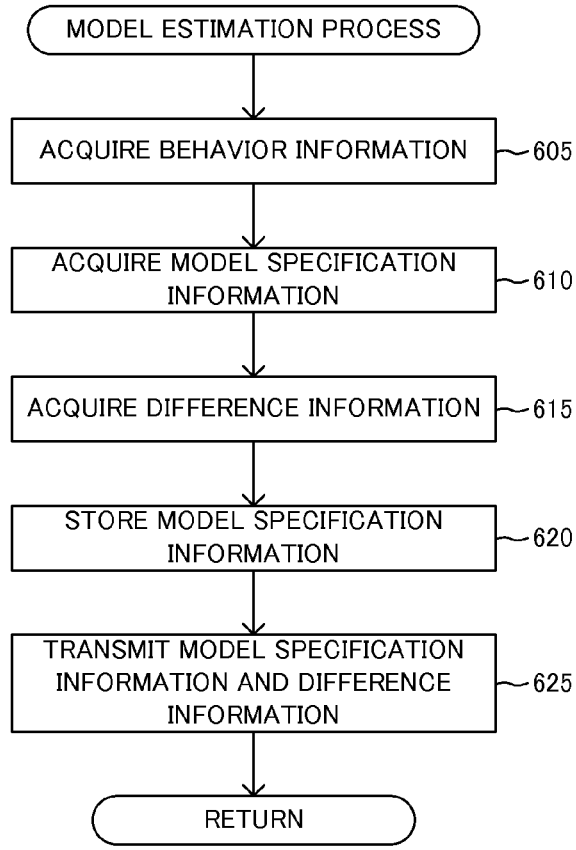
FIG. 6 is a flowchart showing a model estimation process program executed by a CPU of a reception device according to the second exemplary embodiment of the present invention.

The CPU of the reception device 20 is configured to execute a model estimation process program shown by a flowchart in FIG. 6 every time a preset execution period elapses, instead of the model estimation process program shown in FIG. 3. The reception device 20 may be configured to detect a communication load and execute the model estimation process program at the timing corresponding to the detected communication load.

To be specific, upon start of the processing of the model estimation process program, at step 605, the CPU of the reception device 20 acquires behavior information for each packet received by the reception device 20 during a time between previous execution of this program and the present moment.

Then, the CPU acquires model specification information based on the acquired behavior information (step 610). In this embodiment, the CPU acquires model specification information by estimating model specification information by using maximum likelihood estimation.

Next, the CPU acquires difference information representing a difference between the acquired model specification information and latest model specification information stored in the storage device (step 615). Then, the CPU causes the storage device to store the model specification information at the present moment acquired at step 610 (step 620).

Then, the CPU transmits the model specification information acquired at step 610 and the difference information acquired at step 615 to the transmission device 10 (step 625). Then, the CPU ends execution of the model estimation process program.

Figure 7:
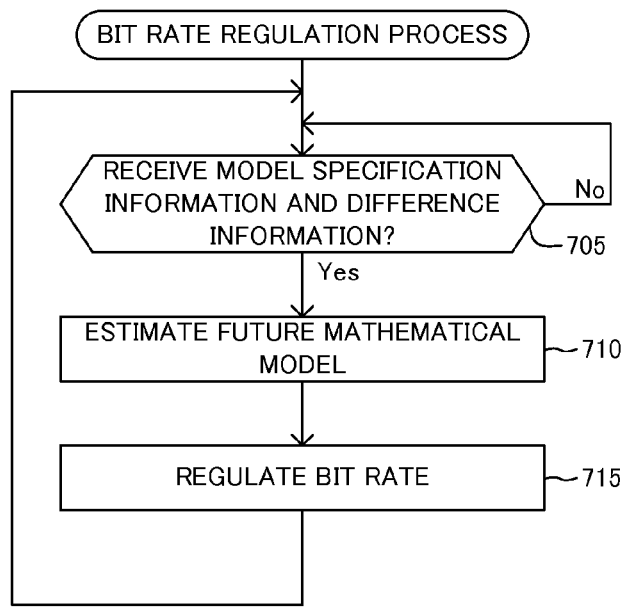
FIG. 7 is a flowchart showing a bit rate regulation process program executed by a CPU of a transmission device according to the second exemplary embodiment of the present invention.

On the other hand, the CPU of the transmission device 10 is configured to execute, instead of the bit rate regulation process program of FIG. 4, a bit rate regulation process program shown by a flowchart in FIG. 7 when the transmission device 10 is started.

To be specific, upon start of the processing of the bit rate regulation process program, at step 705, the CPU of the transmission device 10 stands by until receiving model specification information and difference information. Then, when the transmission device 10 receives model specification information and difference information transmitted by the reception device 20, the CPU of the transmission device 10 determines "Yes" and proceeds to step 710.

At step 710, the CPU estimates a future mathematical model based on a mathematical model specified by the received model specification information and based on the received difference information. Then, the CPU regulates (determines) a bit rate based on the estimated future mathematical model (step 715). After that, the transmission device 10 transmits content data encoded at the determined bit rate among content data stored in the storage device, to the reception device 20.

Then, the CPU returns to step 705 and repeatedly executes the process from step 705 to step 715.

As described above, according to the second exemplary embodiment of the content delivery system (the communication system) of the present invention, it is possible to produce actions and effects like those of the first exemplary embodiment.

Furthermore, according to the second exemplary embodiment, the transmission device 10 can estimate a future mathematical model based on received difference information. Thus, the transmission device 10 can more promptly execute a process (in this embodiment, a process of regulating a bit rate) corresponding to the behavior of a packet represented by the mathematical model.

<Third Exemplary Embodiment>

Next, a communication system according to a third exemplary embodiment of the present invention will be described with reference to FIG. 8.

A communication system 100 according to the third exemplary embodiment includes a transmission device 110 transmitting a packet and a reception device 120 receiving the packet.

A function of the reception device 120 includes a behavior information acquisition unit (a behavior information acquisition means) 121, a model specification information acquisition unit (a model specification information acquisition means) 122, and a model specification information transmission unit (a model specification information transmission means) 123.

The behavior information acquisition unit 121 acquires behavior information that represents the behavior of a received packet from when the packet is transmitted by the transmission device 110 to when the packet reaches the reception device 120.

The model specification information acquisition unit 122 acquires model specification information for specifying a mathematical model representing the behavior of a plurality of packets based on the behavior information acquired by the behavior information acquisition unit 121 for each of the plurality of packets.

The model specification information transmission unit 123 transmits the model specification information acquired by the model specification information acquisition unit 122, to the transmission device 110.

A function of the transmission device 110 includes a model specification information reception unit (a model specification information reception means) 111. The model specification information reception unit 111 receives the model specification information transmitted by the reception device 120.

According to this, the information amount of information transmitted by the reception device 120 to the transmission device 110 in order that the transmission device 110 acquires information representing the behavior of a plurality of packets can be smaller than when the reception device 120 transmits the behavior information of the respective packets. In other words, it is possible to reduce a communication load when the transmission device 110 acquires information representing the behavior of a plurality of packets. Moreover, according to the abovementioned configuration, it is possible to make a processing load of the transmission device 110 smaller than when the transmission device 110 acquires model specification information based on the behavior information.

Although the present invention has been described above with reference to the respective exemplary embodiments, the present invention is not limited to the exemplary embodiments described above. The configuration and details of the present invention can be altered in various manners that can be understood by one skilled in the art within the scope of the present invention.

For example, in modified examples of the respective exemplary embodiments, a mathematical model may be a model represented by a probability density function, or a model other than the hidden Markov model (e.g., a time-series model).

Further, in modified examples of the respective exemplary embodiments, behavior information may be information representing a difference (i.e., a jitter) between a first delay time for one of two packets successively received by the reception device 20 to reach the reception device 20 after being transmitted by the transmission device 10 and a second delay time for the other of the two packets to reach the reception device 20 after being transmitted by the transmission device 10.

The respective functions of the content delivery system 1 in the exemplary embodiments described above are realized by execution of a program (software) by the CPU, but may be realized by hardware such as a circuit.

Further, the program is stored in the storage device in the exemplary embodiments described above, but may be stored in a recording medium that can be read by a computer. For example, the recording medium is a portable medium such as a flexible disk, an optical disk, a magneto-optical disk and a semiconductor memory.

Further, as other modified examples of the exemplary embodiments, any combination of the exemplary embodiments and modified examples described above may be employed.

The present invention is based upon and claims the benefit of priority from Japanese patent application No. 2009-073756, filed on Mar. 25, 2009, the disclosure of which is incorporated herein in its entirety by reference.

Industrial Applicability

The present invention can be applied to, for example, a content delivery system that includes a server device delivering content data representing content and a client device receiving the content data.

Description of Reference Numerals
1 content delivery system (communication system)
10 transmission device
20 reception device
31 content data storage unit
32 packet transmission unit
33 model specification information reception unit
34 bit rate regulation unit
35 difference information reception unit
41 packet reception unit
42 content output unit
43 behavior information acquisition unit
44 model specification information acquisition unit
45 model specification information transmission unit
46 model specification information storage unit
47 difference information transmission unit
100 communication system
110 transmission device
111 model specification information reception unit
120 reception device
121 behavior information acquisition unit
122 model specification information acquisition unit
123 model specification information transmission unit

The invention claimed is:

1. A communication system including a transmission device configured to transmit a packet and a reception device configured to receive the packet, wherein: the reception device includes: a behavior information acquisition unit configured to acquire behavior information that represents behavior of the received packet from when the packet is transmitted by the transmission device to when the packet reaches the reception device; a model specification information acquisition unit configured to acquire model specification information for specifying a mathematical model representing the behavior of a plurality of packets based on the behavior information acquired for each of the plurality of packets, wherein said mathematical model is a model represented by a probability density function f(x) formed by the linear sum of a plurality of probability density functions using behavior information as a random variable x; and a model specification information transmission unit configured to transmit the acquired model specification information to the transmission device; and the transmission device includes a model specification information reception unit configured to receive the model specification information transmitted by the reception device.

2. The communication system according to claim 1, wherein the model specification information has a smaller information amount than an information amount of the plurality of behavior information.

3. The communication system according to claim 1, wherein the transmission device includes a bit rate regulation unit configured to regulate a bit rate of data that is a source of a packet transmitted to the reception device, based on the mathematical model specified by the received model specification information.

4. The communication system according to claim 1, wherein the transmission device includes a packet redundancy number regulation unit configured to, in a case of being configured to transmit a plurality of same packets, regulate a redundancy number, which is a number of the same packets transmitted by the transmission device, based on the mathematical model specified by the received model specification information.

5. The communication system according to claim 1, wherein:
the reception device includes:
a model specification information storage unit configured to store the acquired model specification information; and
a difference information transmission unit configured to transmit difference information that represents a difference between the model specification information acquired and stored in the past and model specification information acquired at the present moment, to the transmission device; and
the transmission device includes a difference information reception unit configured to receive the difference information transmitted by the reception device.

6. The communication system according to claim 1, wherein:
the mathematical model is a model represented by a function using at least one model parameter; and
the model specification information is information that represents the model parameter.

7. The communication system according to claim 1, wherein the mathematical model is a model represented by a probability density function using the behavior information as a random variable.

8. The communication system according to claim 7, wherein:
the probability density function is a probability density function representing a normal distribution; and
the model specification information is information that represents a mean and a variance of the normal distribution.

9. The communication system according to claim 7, wherein:
the probability density function is a probability density function representing a gamma distribution; and
the model specification information is information that represents a shape parameter and a scale parameter of the gamma distribution.

10. The communication system according to claim 1, wherein the mathematical model is a hidden Markov model using the behavior information as a symbol.

11. The communication system according to claim 1, wherein the behavior information includes information representing a delay time, which is a time for the packet to reach the reception device after being transmitted by the transmission device.

12. The communication system according to claim 1, wherein the behavior information includes information that represents a difference between a first delay time for one of two packets successively received by the reception device to reach the reception device after being transmitted by the transmission device and a second delay time for the other of the two packets to reach the reception device after being transmitted by the transmission device.

13. A communication method applied to a communication system including a transmission device configured to transmit a packet and a reception device configured to receive the packet, the communication method comprising: acquiring behavior information that represents behavior of the packet received by the reception device from when the packet is transmitted by the transmission device to when the packet reaches the reception device, by the reception device; acquiring model specification information for specifying a mathematical model representing the behavior of a plurality of packets based on the behavior information acquired for each of the plurality of packets, by the reception device, wherein said mathematical model is a model represented by a probability density function f(x) formed by the linear sum of a plurality of probability density functions using behavior information as a random variable x; transmitting the acquired model specification information to the transmission device, by the reception device; and receiving the model specification information transmitted by the reception device, by the transmission device.

14. The communication method according to claim 13, wherein the model specification information has a smaller information amount than an information amount of the plurality of behavior information.

15. A reception device configured to receive a packet transmitted by a transmission device, the reception device comprising: a behavior information acquisition unit configured to acquire behavior information that represents behavior of the received packet from when the packet is transmitted by the transmission device to when the packet reaches the reception device; a model specification information acquisition unit configured to acquire model specification information for specifying a mathematical model representing the behavior of a plurality of packets based on the behavior information acquired for each of the plurality of packets, wherein said mathematical model is a model represented by a probability density function $f(x)$ formed by the linear sum of a plurality of probability density functions using behavior information as a random variable x; and a model specification information transmission unit configured to transmit the acquired model specification information to the transmission device.

16. The reception device according to claim 15, wherein the model specification information has a smaller information amount than an information amount of the plurality of behavior information.

17. A computer-readable recording medium that records a computer program comprising instructions for causing a reception device configured to receive a packet transmitted by a transmission devise to realize: a behavior information acquisition unit configured to acquire behavior information that represents behavior of the received packet from when the packet is transmitted by the transmission device to when the packet reaches the reception device; a model specification information acquisition unit configured to acquire model specification information for specifying a mathematical model representing the behavior of a plurality of packets based on the behavior information acquired for each of the plurality of packets, wherein said mathematical model is a model represented by a probability density function f(x) formed by the linear sum of a plurality of probability density functions using behavior information as a random variable x; and a model specification information transmission unit configured to transmit the acquired model specification information to the transmission device.

18. The recording medium according to claim 17, wherein the model specification information has a smaller information amount than an information amount of the plurality of behavior information.

19. A transmission device configured to transmit a packet to a reception device, the transmission device comprising a model specification information reception unit configured to receive model specification information, which is information transmitted by the reception device and is information for specifying a mathematical model representing behavior of a plurality of packets from when the plurality of packets are transmitted by the transmission device to when the plurality of packets reach the reception device, wherein said mathematical model is a model represented by a probability density function f(x) formed by the linear sum of a plurality of probability density functions using behavior information as a random variable x.

20. The transmission device according to claim 19, wherein the model specification information has a smaller information amount than an information amount of the plurality of behavior information.

21. A non-transitory computer-readable recording medium that records a computer program comprising instructions for causing a transmission device configured to transmit a packet to a reception device to realize a model specification information reception unit configured to receive model specification information, which is information transmitted by the reception device and is information for specifying a mathematical model representing behavior of a plurality of packets from when the plurality of packets are transmitted by the transmission device to when the plurality of packets reach the reception device, wherein said mathematical model is a model represented by a probability density function f(x) formed by the linear sum of a plurality of probability density functions using behavior information as a random variable x.

22. The recording medium according to claim 21, wherein the model specification information has a smaller information amount than an information amount of the plurality of behavior information.

23. A communication system including a transmission device configured to transmit a packet and a reception device configured to receive the packet, wherein: the reception device includes: a behavior information acquisition means configured to acquire behavior information that represents behavior of the received packet from when the packet is transmitted by the transmission device to when the packet reaches the reception device; a model specification information acquisition means configured to acquire model specification information for specifying a mathematical model representing the behavior of a plurality of packets based on the behavior information acquired for each of the plurality of packets, wherein said mathematical model is a model represented by a probability density function f(x) formed by the linear sum of a plurality of probability density functions using behavior information as a random variable x; and a model specification information transmission means configured to transmit the acquired model specification information to the transmission device; and the transmission device includes a model specification information reception means configured to receive the model specification information transmitted by the reception device.

24. A reception device configured to receive a packet transmitted by a transmission device, the reception device comprising: a behavior information acquisition means configured to acquire behavior information that represents behavior of the received packet from when the packet is transmitted by the transmission device to when the packet reaches the reception device; a model specification information acquisition means configured to acquire model specification information for specifying a mathematical model representing the behavior of a plurality of packets based on the behavior information acquired for each of the plurality of packets, wherein said mathematical model is a model represented by a probability density function f(x) formed by the linear sum of a plurality of probability density functions using behavior information as a random variable x; and a model specification information transmission means configured to transmit the acquired model specification information to the transmission device.

25. A transmission device configured to transmit a packet to a reception device, the transmission device comprising a model specification information reception means configured to receive model specification information, which is information transmitted by the reception device and is information for specifying a mathematical model representing behavior of a plurality of packets from when the plurality of packets are transmitted by the transmission device to when the plurality of packets reach the reception device, wherein said mathematical model is a model represented by a probability density function f(x) formed by the linear sum of a plurality of probability density functions using behavior information as a random variable x.

* * * * *